United States Patent [19]

Bosniack

[11] 4,020,144
[45] Apr. 26, 1977

[54] METHOD FOR REMOVAL OF GASEOUS SULFUR AND NITROGEN COMPOUNDS FROM GAS STREAMS

[75] Inventor: David S. Bosniack, Baytown, Tex.

[73] Assignee: Exxon Research and Engineering Company, Linden, N.J.

[22] Filed: Mar. 1, 1976

[21] Appl. No.: 662,793

Related U.S. Application Data

[63] Continuation-in-part of Ser. No. 574,182, May 2, 1975, abandoned.

[52] U.S. Cl. .............................. 423/226; 423/235; 423/243; 55/68; 55/73
[51] Int. Cl.² ........................................ B01D 53/34
[58] Field of Search ................ 55/68, 73; 423/210, 423/220, 226, 235, 243

[56] References Cited

UNITED STATES PATENTS 3,391,988  7/1968  Fliess ..................................... 55/73
3,784,487  1/1974  Altwicker et al. ................. 423/235
3,831,348  8/1974  Pap ..................................... 423/226
3,904,735  9/1975  Atwood et al. .................... 423/243

*Primary Examiner*—Earl C. Thomas
*Attorney, Agent, or Firm*—James E. Reed

[57] ABSTRACT

Gaseous sulfur and nitrogen compounds are removed from mixed gases containing such compounds by contacting the gases with liquid organic disulfides in a contacting zone and withdrawing gases of reduced sulfur and nitrogen content. After contacting, the disulfides may be stripped of absorbed gases and then reused or instead may be converted into hydrocarbons substantially free of sulfur and nitrogen-containing constituents. The liquid disulfides are particularly effective for the selective removal of hydrogen sulfide from gases containing carbon dioxide.

25 Claims, 1 Drawing Figure

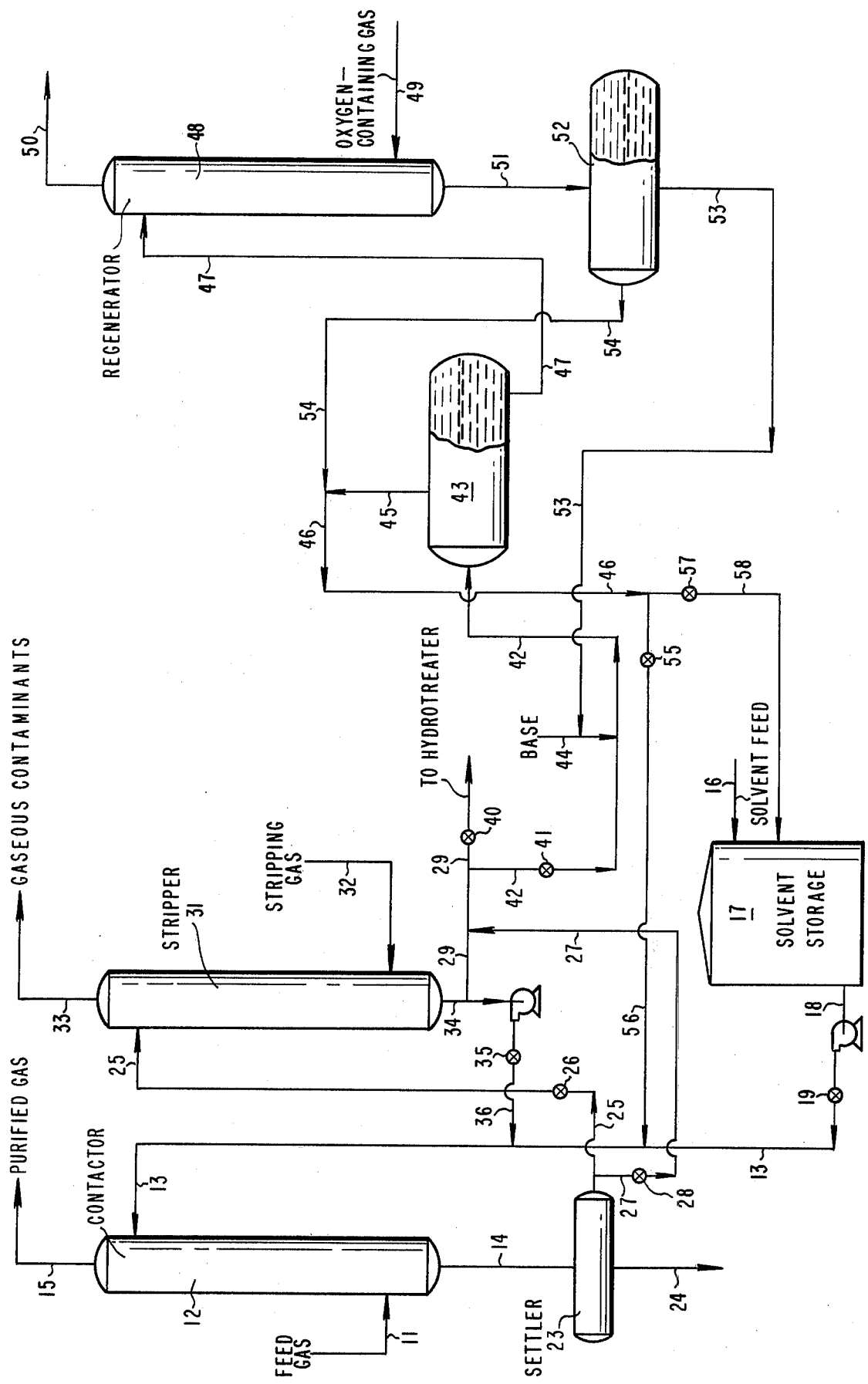

METHOD FOR REMOVAL OF GASEOUS SULFUR AND NITROGEN COMPOUNDS FROM GAS STREAMS

CROSS REFERENCE TO RELATED APPLICATIONS

This application is a continuation-in-part of Ser. No. 574,182, filed in the U.S. Pat. and Trademark Office on May 2, 1975, now abandoned.

BACKGROUND OF THE INVENTION

1. Field of the Invention

This invention relates to the separation of gases and is particularly concerned with the removal of gaseous sulfur and nitrogen compounds from other gases by contacting the gases with liquid organic disulfides.

2. Description of the Prior Art

There are many situations which require the separation of hydrogen sulfide, sulfur oxides, nitrogen oxides, or similar compounds from other gases. In some cases one or more such compounds may be present in relatively high concentrations and recovered as the principal product but in most instances these compounds are present in relative low concentrations and are regarded as contaminants which must be removed before the other gases can be further processed or vented to the atmosphere. This is particularly true today because the majority of the sulfur and nitrogen-containing compounds are considered harmful air pollutants which cannot be discharged into the atmosphere. Contaminants of particular concern are hydrogen sulfide, nitrogen dioxide and sulfur dioxide. It is often desirable to selectively remove these contaminants from gas streams containing carbon dioxide.

There are numerous commercial processes which can be used to remove hydrogen sulfide and other acid gases from natural, refinery, and synthesis gas streams. Several of these processes utilize an aqueous solution of an alkanolamine as a solvent to absorb the gaseous contaminants. A monoethanolamine solution is used to remove both hydrogen sulfide and carbon dioxide. If it is also desirable to remove carbonyl sulfide and carbon disulfide, a diethanolamine solution can be used. A certain degree of selectivity in the presence of carbon dioxide may be obtained by using a triethanolamine solution but this solvent is more expensive than the others.

Another group of processes utilizes solvents composed of alkaline salt solutions, usually a potassium carbonate solution, in combination with various additives and catalysts. These processes are normally used to remove hydrogen sulfide, carbon dioxide, carbonyl sulfide and carbon disulfide from contaminated gas streams. Only a few of these processes can be employed to selectively remove hydrogen sulfide in the presence of carbon dioxide.

There are other commercial processes available which utilize sophisticated organic solvents as absorbents. One such process employs the dimethyl ether of polyethylene glycol, which has a strong preference for most sulfur-containing compounds and the capacity to absorb large quantities of most impurities economically. Still other proposed processes for treating gas streams involve, for example, the removal of both sulfur dioxide and hydrogen sulfide from flue gas streams by contacting the streams with an aqueous solution of sodium carbonate and then reacting the resulting solution with ammonium hydrogen carbonate.

The processes referred to above and similar techniques have pronounced disadvantages. The solvent utilized to absorb the gaseous impurities may be expensive, may have an affinity for only a few contaminants, may exhibit a high absorptive capacity but not be selective in the presence of carbon dioxide or may have a high selectivity for particular compounds but show little absorptive capacity. None of the solvents which have been proposed heretofore have the ability to absorb large quantities of hydrogen sulfide, sulfur oxides and nitrogen oxides while still exhibiting a high selectivity for such compounds in the present of carbon dioxide. It should also be noted that many of the commercial and proposed processes are undesirable because they are overly complicated, utilize cumbersome equipment, require the maintenance of high pressure and low temperatures, or are expensive to operate.

SUMMARY OF THE INVENTION

This invention provides an improved process for the removal of gaseous sulfur compounds, nitrogen compounds, or mixtures of such compounds from gas streams that alleviates many of the difficulties encountered in the past. In accordance with the invention, it has now been found that gaseous sulfur and nitrogen compounds such as hydrogen sulfide, sulfur oxides, nitrogen oxides and the like can be separated from other gases by contacting the gases with liquid organic disulfides in a contacting zone and withdrawing gases of lower sulfur and nitrogen content. Depending upon the particular feed stream employed, the gas from which the sulfur and nitrogen compounds have been removed may be passed to downstream units for further processing or vented into the atmosphere. The disulfide solvent containing absorbed gases may be removed from the contacting zone, stripped of the absorbed gases and returned to the contacting zone for reuse or passed to a downstream unit for conversion into sulfur-free hydrocarbons by hydrogen treating or other methods. Stripping may be accomplished by contacting the solvent with an inert gas or the like.

Studies indicate that small amounts of mercaptans and elemental sulfur tend to be produced when the disulfide solvent is contacted repeatedly with gas containing hydrogen sulfide. This phenomenon is apparently the result of an interaction between the disulfide molecules of the solvent and the hydrogen sulfide molecules in the gas. The mercaptans may be convereted back to disulfides by treating the mercaptans with an oxidizing agent in the presence of a base.

A mixture of liquid organic disulfides will normally be employed in carrying out the process but a pure disulfide may be used if desired. Suitable disulfides can be obtained relatively inexpensively by the oxidation of alkaline solutions obtained by treating gaseous or liquid mercaptan-containing hydrocarbon streams with a base. In addition to exhibiting a high capacity for absorbing hydrogen sulfide, sulfur dioxide, nitrogen dioxide and related materials, the organic disulfides show a high degree of selectivity for such materials in the presence of carbon dioxide and other gases.

The process of the invention has numerous advantages over previous methods for removing gaseous sulfur and nitrogen compounds from gas streams. The organic disulfides exhibit a high absorptive capacity for a wide range of gaseous sulfur and nitrogen compounds while maintaining a high selectivity for such compounds in the presence of carbon dioxide and other gases which often accompany the sulfur and nitrogen compounds. This affinity for the gaseous sulfur and nitrogen compounds permits the removal of such compounds from natural gas, industrial gases, synthesis gas and similar streams by contacting the gases with a single solvent in lieu of several contacting steps and a variety of different solvents that might otherwise be required. The process facilitates the recovery of hydrogen sulfide and related compounds in high concentrations, simplifies the elimination of objectionable materials from gaseous effluents, and permits the separation of gases at relatively low cost. The organic disulfides also exhibit corrosion inhibiting tendencies and their use may therefore serve to prolong the life of the processing equipment. The use of the organic disulfides in accordance with the invention thus provides a simple, effective and inexpensive process which has many potential applications.

BRIEF DESCRIPTION OF THE DRAWING

The single FIGURE in the drawing is a schematic flow diagram of a gas purification process carried out in accordance with the invention.

DESCRIPTION OF THE PREFERRED EMBODIMENT

In the process depicted in the drawing, a feed gas stream which is to be purified by the removal of hydrogen sulfide, sulfur dioxide, nitrogen dioxide and similar compounds is introduced through line 11 into the contacting zone in a scrubber, absorber or similar contacting vessel 12. The feed gas may be any natural or industrial process gas which contains one or more sulfur or nitrogen-containing impurities. It may be a synthesis gas from which hydrogen sulfide is to be removed before the gas is further processed; it may be a flue or stack gas containing harmful air pollutants in the form of nitrogen and sulfur oxides which are to be eliminated before the gas is vented to the atmosphere; it may be a refinery or chemical plant process stream containing hydrogen sulfide, sulfur dioxide, sulfur trioxide, carbonyl sulfide, carbon disulfide, nitric oxide, nitrous oxide, nitrogen dioxide, or a similar gaseous sulfur or nitrogen compound produced by the treating or conversion of hydrocarbons or other feed materials; or it may be a sour stream of natural gas containing impurities such as hydrogen sulfide, carbonyl sulfide, carbon disulfide, methyl mercaptan, hydrogen cyanide, and the like.

The feed gas is introduced into the bottom of contacting vessel 12 and moves upwardly through the contacting zone where it comes in contact with a downflowing stream of solvent introduced into the top of the vessel via line 13. If desired, the contacting zone may be provided with spray nozzles, perforated plates, bubble cap plates, packing or other means for promoting intimate contact between the gas and liquid. As the feed gas rises through the contacting zone, sulfur and nitrogen-containing impurities initially present in the feed stream are absorbed in the solvent which then exits the vessel through line 14. The purified gas is removed from the vessel through line 15 and may then be either vented to the atmosphere or transferred to downstream units for further processing.

The solvent used to absorb the gaseous impurities from the feed gas is composed of liquid organic disulfides. It has been found that these organic disulfides have a high capacity for absorbing sulfur and nitrogen-containing gases while at the same time exhibiting a low affinity for air, steam, nitrogen, carbon dioxide, carbon monoxide, hydrogen, methane, ethane, propane, ethylene, and the like. Other solvents capable of absorbing gaseous sulfur and nitrogen compounds from synthesis gases, hydrocarbons and similar streams, on the other hand, generally also tend to absorb other constituents of the feed gas, particularly carbon dioxide, and are therefore nonselective for the sulfur and nitrogen compounds. Although in some cases the simultaneous absorption of both carbon dioxide and compounds such as hydrogen sulfide may be advantageous, there are many instances where it is not. The organic disulfides can be used to selectively absorb gaseous sulfur and nitrogen compounds from gases also containing carbon dioxide and exhibit greater absorptive capacity and better selectivity than any solvent now commercially utilized for the removal of hydrogen sulfide from industrial gases. The exact mechanisms involved and the reasons for the particular effectiveness of the disulfides are not fully understood. There are indications, however, that their absorptive capacity may be due not only to physical absorption but also chemical absorption involving a reaction between the disulfides and the gaseous impurities.

The solvent will normally be a mixture of liquid organic disulfides but a pure disulfide may be used if available in the required quantities. The individual compounds making up the solvent have the generalized formula $R_1 — S — S — R_2$, where $R_1$ and $R_2$ may be the same or different and may be, for example, (1) straight or branched chain aliphatic groups having from 1 to about 15 carbon atoms, such as methyl, ethyl, butyl, isobutyl, hexyl, isoctyl, isooctenyl, and dodecyl radicals; (2) cycloaliphatic groups having from 3 to about 20 carbon atoms, such as cyclopropyl, methyl cyclobutyl, cyclohexenyl, butyl cyclohexyl and octyl perhydronaphthyl radicals; (3) aryl groups having from 6 to about 42 carbon atoms, such as phenyl, benzyl, tolyl, xylyl, naphthyl, naphthylmethylene, dioctylphenyl, indenyl, and didodecylphenyl radicals; and (4) mixed radicals derived from natural or synthetic materials such as tallow, coconut oil, soybean oil and oxo alcohols.

Specific examples of disulfides which may be present in the solvent, alone or in combination with other compounds, include methyl hexyl disulfide, diisopropyl disulfide, methyl ethylene disulfide, dipropylene disulfide, ethylene nonene disulfide, dipropyne disulfide, methyl heptyne disulfide, dicyclohexane disulfide, ethyl cyclopentane disulfide, dicyclohexane disulfide, cyclopropane cyclopentene disulfide, diphenyl disulfide, ethyl phenyl disulfide, dinaphthyl disulfide, phenyl naphthyl disulfide, ditolyl disulfide, distyryl disulfide, propene mesityl disulfide, and the like.

Because of the reactivity of double and triple bonds, there may be a tendency for these bonds to interact with the contaminants in the gas being treated. It is therefore preferred that $R_1$ and $R_2$ be radicals containing no unsaturated bonds except for those bonds found in the aromatic portion of the radicals, such as: (1) straight and branched chain alkyl radicals having from 1 to about 15 carbon atoms; (2) cycloalkyl radicals having from 3 to about 20 carbon atoms, such as cyclopropyl, cyclopentyl and cyclohexyl radicals; and (3)

aryl radicals having from 6 to about 42 carbon atoms, such as

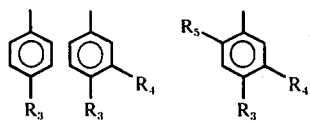

where $R_3$, $R_4$ and $R_5$ are straight and branched chain alkyl groups containing from 1 to 12 carbon atoms and

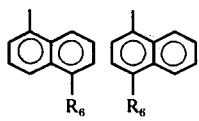

where $R_6$ is a straight or branched chain alkyl group containing from 1 to 12 carbon atoms.

As can be seen from the above, the solvent may be a mixture of many diverse types of disulfides such as dialkyl disulfides, dicycloalkyl disulfides, diaryl disulfides, alkyl cycloalkyl disulfides, alkyl aryl disulfides and cycloalkyl aryl disulfides, among others. Excellent results have been obtained, for example, with a solvent composed of 86% diaryl disulfides and 14% alkyl aryl disulfides, the predominant species being ditolyl disulfide. A solvent composed primarily of a mixture of diaryl disulfides containing from 12 to 30 carbon atoms per molecule is generally preferred.

Satisfactory solvents containing mixed liquid organic disulfides can be prepared by the oxidation of mercaptans with a variety of mild oxidizing agents, such as sulfuric acid or atmospheric oxygen. A convenient and inexpensive source or organic disulfides is the product obtained by air blowing alkaline solutions produced by the treatment of mercaptan-containing liquid and gaseous hydrocarbons with a base, a process which has been described in the patent literature and will therefore be familiar to those skilled in the art. Such alkaline solutions are frequently produced when high sulfur crude oils and petroleum fractions are refined. Many refinery process streams contain mercaptans which must be removed before the streams can be further processed. The mercaptans are partially removed by treating the streams with an alkaline wash, such as a solution of sodium hydroxide. The alkaline wash solution extracts the mercaptans in the form of alkali salts or mercaptides. By air blowing the spent alkaline solution, the mercaptides are oxidized and form an insoluble layer of organic disulfides which can be readily recovered and used as a gas treating solvent. The actual disulfide composition of the solvent thus produced will depend somewhat upon the distribution and types of mercaptans found in the refinery streams treated with the alkaline wash, which will in turn vary from refinery to refinery and will depend in part upon the type of crude oil being refined. A chemical analysis of an organic disulfide solvent obtained by air blowing a composite was solution formed by combining spent alkaline solutions produced in several different refineries around the country is set forth in Table I below. The analysis is believed to be representative of the solvent obtained by air blowing typical spent alkaline solutions.

TABLE I

Composition of Disulfide Solvent Produced by Air Blowing Spent Alkaline Solution

| Compound | Wt. % of Disulfide* |
|---|---|
| Methyl Phenyl Disulfide | 0.44 |
| Methyl Tolyl Disulfide | 2.97 |
| Ethyl Tolyl Disulfide | 5.25 |
| Propyl Tolyl Disulfide | 3.36 |
| Higher Boiling Alkyl Aryl Disulfides | 2.09 |
| Diphenyl Disulfide | 2.42 |
| Phenyl Tolyl Disulfide | 13.11 |
| Ditolyl Disulfide | 41.82 |
| Higher Boiling Diaryl Disulfides | 28.54 |
| | 100.0 |

*Along with the disulfides, the fresh solvent may also contain small amounts of unreacted mercaptans and other organic compounds but these will not seriously affect the solvent's performance.

In the process depicted in the drawing the solvent, preferably one produced by air blowing an alkaline solution as discussed above, is passed via line 16 into storage tank 17. The solvent is then pumped from the storage tank through line 18, valve 19 and line 13 into contacting vessel 12 as needed.

The contacting vessel employed in the process may be any type of liquid-gas contacting vessel such as an absorption column or a scrubber. If the feed gas is a particulates-free process gas stream, it is generally preferred that the contacting vessel be a packed or plate absorber. On the other hand, if a particulates-containing flue gas is to be purified, then a scrubber is preferred so that particulates as well as sulfur and nitrogen oxides will be removed.

The absorption process may be carried out at any desired pressure. The actual pressure utilized may depend on the source of the feed gas. For example, if the feed gas is a sour natural gas from a high pressure gas well, it may be desirable to operate the contactor at high pressures, pressures ranging from about 500 to about 3000 pounds per square inch or more, depending on the wellhead pressure. If, on the other hand, the feed gas is a stack gas, it may be desirable to carry out the absorption step at about atmospheric pressure. The temperature should normally be maintained somewhat below the initial boiling point of the solvent at the operating pressure. Depending on the temperature of the feed gas, it may be advisable either to cool or heat the solvent or feed gas before it is injected into the contacting vessel.

The solvent, which now contains absorbed gases, is withdrawn from the bottom of the contacting vessel and passed through line 14 into settling zone 23. Here any particulate matter scrubbed from the feed gas by the solvent is allowed to settle and is withdrawn through line 24. The particulate matter may be fly ash, char, or in some cases elemental sulfur formed by interaction of the solvent with sulfur-containing contaminant gases or by the interaction of such gases. After the removal of particulate matter, the spent solvent is passed either through line 25 and valve 26 into stripper 31 or through line 27 and valve 28 into line 29 and then transported through valve 40 to a conventional hydrotreater or similar unit where it can be converted into valuable hydrocarbons and $H_2S$.

In stripper 31, absorbed gaseous contaminants are removed from the solvent. The contaminants are then withdrawn overhead through line 33 and passed to downstream units for further processing. The stripped solvent is removed from vessel 31 through line 34 and returned to vessel 12 via valve 35 and lines 36 and 13. The stripper process may be carried out by injecting an inert stripping gas such as nitrogen into the bottom of the stripper and allowing the rising gas to contact the downflowing solvent. Since water catalyzes the reaction between $H_2S$ and $SO_2$ to form elemental sulfur, steam should not ordinarily be used as a stripping gas unless the solvent is dried before it is returned to the contacting vessel. The absorbed gases may also be removed from the solvent simply by vacuum stripping. The stripper is maintained at a reduced pressure so that the contaminant gases are vacuum stripped from the solvent as it flows downwardly through the stripper. If the latter method is used, it is desirable that the stripper contain trays to increase turbulence and thereby facilitate the stripping process.

Studies indicate that some mercaptans and elemental sulfur are produced when a disulfide solvent is contacted over extended periods with gas containing hydrogen sulfide. Apparently this phenomenon is the result of an interaction between the disulfide molecules of the solvent and the hydrogen sulfide molecules. It is theorized that the disulfide molecules are reduced to their corresponding mercaptans by hydrogen sulfide which is itself oxidized to elemental sulfur in accordance with the following equation:

$$R_1SSR_2 + H_2S \rightarrow R_1SH + R_2SH + S°.$$

Evidently the elemental sulfur is capable of dissolving to a certain extent in the disulfide solvent.

If the concentration of mercaptans due to the above-described phenomenon becomes excessive, it may be advantageous to regenerate the solvent by converting the mercaptans back to disulfides. This may be accomplished by oxidizing the mercaptans in the presence of a base. Instead of passing the solvent exiting the stripper in line 34 directly back to the contactor, valves 35 and 40 are closed, valve 41 is opened, and the solvent is passed through line 29 into line 42 where it is mixed with a base injected into line 42 via line 44. The base may be any compound that reacts with a mercaptan to form a salt or mercaptide. Preferably the base will be an alkaline wash solution of sodium hydroxide, potassium hydroxide or the like which extracts the mercaptans from the solvent in the form of mercaptides. The mixture of alkaline wash solution and solvent is then passed into settling drum 43 where the two liquid phases are allowed to separate. The disulfides will normally have a lower specific gravity than the spent alkaline solution and hence the spent alkaline solution containing the mercaptides will settle to the bottom, while the disulfides form a lighter upper layer. After the two liquid phases have separated in the drum, the disulfides are passed through lines 45 and 46 and are then either returned to the contactor via valve 55 and lines 56 and 13 or passed to solvent storage tank 17 via line 58 and valve 57. The spent alkaline solution, which contains the mercaptides, is passed through line 47 into the top of regenerator or similar vessel 48.

In the regenerator the mercaptides are converted by oxidation into disulfides. An oxygen-containing gas, preferably air, is injected into the bottom of the regenerator through line 49 and passed upwardly through the downflowing spent alkaline solution. The oxygen-containing gas then exits the regenerator through line 50 and is either vented to the atmosphere or sent to downstream units for further processing. The oxidation reaction taking place in the regenerator converts the mercaptides back to disulfides while regenerating the spent alkaline solution. The regenerator employed in the process may be any type of liquid gas contacting vessel containing sufficient internals to effect fairly good contact between the downflowing alkaline solution and the rising gas.

The bottoms from the regenerator are passed through line 51 into settling drum 52 where the lighter reconstituted disulfides form an upper liquid phase while the alkaline wash solution forms a lower liquid phase. The regenerated alkaline wash solution is then passed through line 53 to line 44 where it serves as makeup for the treating of the stripper bottoms. The reconstituted disulfides are passed from drum 52 through lines 54 and 46 and then are either returned to the contactor via valve 55 and lines 56 and 13 or passed to solvent storage tank 17 through line 58 and valve 57.

It will be understood, of course, that the conversion of mercaptans back to disulfides may be carried out in ways other than that described above. For example, the pretreatment of the stripper bottoms with an alkaline wash solution and the use of settling drum 43 are not critical. The conversion may be carried out simply by contacting the stripper bottom with an oxidizing agent in the presence of a base, thereby regenerating the solvent. Further, it is not necessary that the oxidizing agent be an oxygen-containing gas. It may be any one of a variety of oxidizing agents such as perborates, sulfuric acid, or the like.

The solvent may have a tendency to lose its effectiveness as an absorbent after it has been passed between the contactor and the stripper or regenerator numerous times. When this occurs, it becomes desirable to replace the spent solvent with fresh solvent. This may be accomplished by closing valves 35 and 41, withdrawing the solvent from the bottom of the stripper through line 34 and passing it through line 29 and valve 40 to a hydrotreater, not shown in the drawing, where the spent solvent may be conventionally hydrotreated and converted to useful hydrocarbons and $H_2S$. The converted solvent is then replaced by fresh solvent which is pumped from storage tank 17 through line 18, valve 19 and line 13 into contacting vessel 12.

It will be understood that the process of the invention is not restricted to the embodiment disclosed above and can be applied to any process in which a gas stream containing gaseous sulfur compounds, gaseous nitrogen compounds, or mixtures of such compounds is contacted with a solvent containing the liquid organic disulfides, alone or in combination with one or more other gas treating solvents or absorbents such as monoethanolamine with which it is compatible. It is not necessary, for example, that the solvent be continuously fed and removed from the contactor as shown in the drawing. The contacting step may be carried out as a batch process where the solvent remains in the contactor while the feed gas is passed upwardly through it. In addition, the process of the invention may be conducted without a stripper or a regenerator, although it may be preferable from the standpoint of economics to use one or both. The stripper and regenerator may be removed from the process scheme shown in the drawing by simply closing valves 26, 35 and 41. Valve 19 is then opened and solvent is continuously fed through lines 18 and 13 into the top of contacting vessel 12. Since valves 26 and 41 are now closed, solvent exiting settling zone 23 through line 25 is passed into line 27, through valve 28, into line 29, through valve 40 and downstream to the hydrotreater.

The nature and objects of the invention are further illustrated by the results of laboratory tests carried out in a mixture of liquid organic disulfides. To test the effectiveness of the disulfide solvent, 100 grams of solvent having a composition similar to that set out in Table I was placed in a 250 milliliter one-neck glass flask. $H_2S$ was then passed into the solvent through plastic tubing fitted with a coarse grade glass sparging tube which was immersed in the solvent. Excess $H_2S$ was introduced into the solvent to obtain maximum equilibrium solubility. The solubility at atmospheric pressure of the $H_2S$ was then measured at 35°, 75° and 190° F. Identical tests were performed to measure the solubility of $SO_2$, $NO_2$ and $CO_2$ in the solvent. To provide a reference, nitrogen was also passed through the solvent and its solubility was measured at the same three temperatures. The results obtained from these tests are set forth below in Table II.

TABLE II

Gas Solubility in Organic Disulfide Solvent*

| Temp. (° F.) | Gas | Solubility gms Gas per 100 gms Solvent | Selectivity - Ratio of Gas to $CO_2$ Solubility |
|---|---|---|---|
| 35 | $H_2S$ | 2 | 5 |
|  | $SO_2$ | 28 | 70 |
|  | $NO_2$ | 14 | 35 |
|  | $CO_2$ | 0.4 | — |
|  | $N_2$ | Nil | — |
| 75 | $H_2S$ | 4 | 13.3 |
|  | $SO_2$ | 9.7 | 32.3 |
|  | $NO_2$ | 13 | 43.3 |
|  | $CO_2$ | 0.3 | — |
|  | N2 | Nil | — |
| 190 | $H_2S$ | 2.2 | 220 |
|  | $SO_2$ | 1.6 | 16 |
|  | $NO_2$ | 9.5 | 95 |
|  | $CO_2$ | .01 | — |
|  | $N_2$ | Nil | — |

*The composition of the solvent was similar to that set out in Table I.

Table III compares the experimentally measured solubilities of $H_2S$ and $CO_2$ in the organic disulfide solvent at 75° F. with solubility data reported in the literature for various other solvents.

TABLE III

Solubilities of $H_2S$ and $CO_2$ at 75° F. in Organic Disulfide Solvent Compared to Other Selected Solvents

| Solvent | Solubility[1] ($cm^3$ Gas/$cm^3$ Solvent) $H_2S$ | $CO_2$ | Selectivity - Ratio of $H_2S$ to $CO_2$ Solubility |
|---|---|---|---|
| Organic Disulfide[2] | 26.4 | 1.5 | 17.6 |
| Bayol 35 (Technical Grade White Oil, 34 SSU at 100° F.) | 4.9 | 1.90 | 2.58 |
| Water | 2.5 | 0.8 | 3.12 |
| Propylene Carbonate | 13.2 | 3.48 | 3.8 |
| Butyrolacetone | 19.7 | 3.75 | 5.25 |
| Sulfolane - W[3] (Sulfolane + 3% $H_2O$) | 15.9 | 2.90 | 5.5 |
| Methoxy-tripropylene-glycol | 17.8 | 2.61 | 6.8 |
| Selexol (Dimethoxy-tetraethylene-glycol) | 26.0 | 3.63 | 7.2 |
| Triethyl Phosphate | 30.0 | 3.76 | 8.0 |
| Trigol (Methoxy-triethylene-glycol) | 21.4 | 2.63 | 8.15 |
| 5-95 $H_2O$ - Trigol | 17.1 | 1.97 | 8.88 |
| Triethylene Glycol | 13.2 | 1.41 | 9.3 |
| M-Pyrol (H-methyl-pyrrolidone) | 49.0 | 3.94 | 12.4 |

[1]The solubility data reported for the organic disulfide is the same data, converted to other units, that was experimentally measured and reported in Table II. The solubility data reported for the remaining solvents was culled from the literature.
[2]The composition of the organic disulfide used was similar to that set out in Table I.
[3]Sulfolane is the term commonly used for tetramethylene sulfone.

It can be seen from Table II that the organic disulfide solvent is very versatile in that it has high absorptive capacities for not only $H_2S$ but also $NO_2$ and $SO_2$. Table III indicates that the disulfide solvent's absorptive capacity with respect to $H_2S$ is superior to most other solvents used for $H_2S$ absorption. The table also shows that the organic disulfide's selectivity of $H_2S$ absorption over $CO_2$ absorption is far superior to that of any other listed solvent.

Tests similar to those described above were carried out to compare the performance of the organic disulfide solvent to that of a standard gas treating solvent composed of 15 parts monoethanolamine (MEA) and 85 parts water. The solubilities of $H_2S$ and $CO_2$ were measured in solvents composed of (1) 15 parts MEA and 85 parts water, (2) 15 parts MEA and 85 parts organic disulfide, and (3) 5 parts MEA and 95 parts organic disulfide. The results of this series of tests are set forth in Table IV below:

TABLE IV

Solubilities of $H_2S$ and $CO_2$ in Organic Disulfide Solvent Compared to Solutions of Monoethanolamine (MEA)

| Temp. (° F.) | Solvent | Solubility gms Gas per 100 gms Solvent $H_2S$ | $CO_2$ | Selectivity - Ratio of $H_2S$ to $CO_2$ Solubility |
|---|---|---|---|---|
| 35 | Organic Disulfide* | 2 | .4 | 5.0 |
|  | 15 MEA/85 $H_2O$ | 8.7 | 7.9 | 1.1 |
| 75 | Organic Disulfide* | 4 | .3 | 13.3 |
|  | 15 MEA/85 $H_2O$ | 8.2 | 7.9 | 1.04 |
|  | 15 MEA/85 Organic Disulfide* | 5.66 | 1.23 | 4.6 |
|  | 5 MEA/95 Organic Disulfide* | 4.79 | .60 | 8.0 |

*The composition of the organic disulfide solvent was similar to that shown in Table I.

The test results show that $H_2S$ is much more soluble in the aqueous MEA solution than in the organic disulfide solvent. The aqueous MEA solution, however, shows virtual nonselectivity over $CO_2$. This is a major drawback to the use of aqueous MEA solutions as gas treating solvents. The organic disulfide solution, on the other hand, exhibits high selectivity over $CO_2$. The pronounced effect of the disulfides on the selectivity is shown by the drastic rise of the selectivity ratio when the water in the MEA solution is replaced with the organic disulfide solvent. In some cases it may be advantageous to employ mixtures of the disulfides with monoethanolamine or other gas treating solvents or absorbents to obtain mixed treating agents having specialized properties or for other reasons.

It will be apparent from the preceding discussion that the invention provides an improved process for purifying and treating industrial gases which is applicable to gases containing a wide range of impurities and which exhibits a high degree of selectivity in the presence of $CO_2$ while maintaining a high level of absorption. The process is more effective, much simpler, less expensive, more versatile and utilizes less cumbersome equipment than most commercial processes now available.

I claim:
1. A process for removing a gaseous constituent selected from the group consisting of gaseous sulfur and nitrogen compounds from a mixture of gases containing said gaseous constituent in combination with at least one other gas comprising:
   a. contacting said mixture of gases with a liquid organic solvent in a contacting zone, said solvent comprising at least one compound of the formula $R_1 — S — S — R_2$ wherein $R_1$ and $R_2$ are selected from the group consisting of straight and branched chain aliphatic radicals having from 1 to about 15 carbon atoms, cycloaliphatic radicals having from 3 to about 20 carbon atoms, and aryl radicals having from 6 to about 42 carbon atoms; and
   b. withdrawing gas from which said gaseous constituent has been removed from said contacting zone.

2. A process as defined in claim 1 wherein said gaseous constituent comprises hydrogen sulfide.

3. A process as defined in claim 1 wherein said gaseous constituent comprises an oxide of nitrogen.

4. A process as defined in claim 1 wherein said mixture of gases comprises at least one sulfur compound and at least one nitrogen compound in combination with at least one other gas.

5. A process as defined in claim 1 wherein $R_1$ and $R_2$ are straight and branched chain alkyl radicals having from 1 to about 15 carbon atoms.

6. A process as defined in claim 1 wherein $R_1$ and $R_2$ are cycloalkyl radicals having from 3 to about 20 carbon atoms.

7. A process as defined in claim 1 wherein said solvent comprises a mixture of diaryl and alkyl aryl disulfides.

8. A process as defined in claim 1 wherein said solvent comprises a mixture of diaryl disulfides.

9. A process as defined in claim 8 wherein said diaryl disulfides contain from about 12 to about 30 carbon atoms per molecule.

10. A process as defined in claim 1 wherein said solvent comprises ditolyl disulfide.

11. A process as defined in claim 1 including the additional steps of passing said solvent from said contacting zone to a stripping zone; stripping absorbed gases from said solvent in said stripping zone; and returning the stripped solvent to said contacting zone.

12. A process as defined in claim 1 including the additional steps of passing said solvent from said contacting zone to a regeneration zone; regenerating said solvent in said regeneration zone by contacting said solvent with an oxidizing agent in the presence of a base; and returning the regenerated solvent to said contacting zone.

13. A process for removing sulfur and nitrogen-containing gaseous impurities from a mixture of gases containing said gaseous impurities in combination with other gases which comprises:
   a. contacting said mixture of gases with a liquid organic solvent in a contacting zone, said solvent comprising at least one compound of the formula $R_1 — S — S — R_2$ wherein $R_1$ and $R_2$ are selected from the group consisting of straight and branched chain aliphatic radicals having from 1 to about 15 carbon atoms, cycloaliphatic radicals having from 3 to about 20 carbon atoms, and aryl radicals having from 6 to about 42 carbon atoms;
   b. withdrawing a purified product gas from said contacting zone;
   c. passing said solvent from said contacting zone to a stripping zone;
   d. stripping absorbed gases from said solvent in said stripping zone; and
   e. returning the stripped solvent to said contacting zone.

14. A process as defined in claim 13 wherein said gaseous impurities comprise oxides of sulfur.

15. A process as defined in claim 13 wherein said gaseous impurities comprise sulfur dioxide.

16. A process as defined in claim 13 wherein said gaseous impurities comprise hydrogen sulfide.

17. A process as defined in claim 13 wherein said mixture of gases comprises a stack gas.

18. A process as defined in claim 13 wherein said mixture of gases comprises a synthesis gas.

19. A process as defined in claim 13 wherein said gaseous impurities comprise nitrogen dioxide.

20. A process as defined in claim 13 wherein said solvent is a mixture of organic disulfides obtained by air blowing an alkaline solution produced by the treatment of mercaptan-containing hydrocarbons with a base.

21. A process for removing a gaseous constituent selected from the group consisting of gaseous sulfur and nitrogen compounds from a mixture of gases containing said gaseous constituent in combination with at least one other gas comprising:
   a. contacting said mixture of gases with a liquid organic solvent in a contacting zone, said solvent comprising a mixture of organic disulfides obtained by air blowing an alkaline solution produced by the treatment of mercaptan-containing hydrocarbons with a base; and
   b. withdrawing gas from which said gaseous constituent has been removed from said contacting zone.

22. A process for removing sulfur and nitrogen containing gaseous impurities from a mixture of gases containing said gaseous impurities in combination with other gases with comprises:
   a. contacting said mixture of gases with a liquid organic solvent in a contacting zone, said solvent comprising at least one compound of the formula $R_1 — S — S — R_2$ wherein $R_1$ and $R_2$ are selected from the group consisting of straight and branched chain aliphatic radicals having from 1 to about 15 carbon atoms, cycloaliphatic radicals having from 3 to about 20 carbon atoms, and aryl radicals having from 6 to about 42 carbon atoms;
   b. withdrawing a purified product gas from said contacting zone;
   c, passing said solvent from said contacting zone to a stripping zone;
   d. stripping absorbed gases from said solvent in said stripping zone;
   e. passing the stripped solvent from said stripping zone to a regeneration zone;

f. regenerating said solvent in said regeneration zone by contacting said solvent with an oxidizing agent in the presence of a base; and g. returning the regenerated solvent to said contacting zone.

23. A process as defined in claim 22 wherein at least one of the gaseous impurities comprises hydrogen sulfide.

24. A process as defined in claim 22 wherein said oxidizing agent comprises an oxygen-containing gas.

25. A process for removing sulfur and nitrogen-containing gaseous impurities from a mixture of gases containing said gaseous impurities in combination with other gases which comprises:

a. contacting said mixture of gases with a liquid organic solvent in a contacting zone, said solvent comprising at least one compound of the formula $R_1 — S — S — R_2$ wherein $R_1$ and $R_2$ are selected from the group consisting of straight and branched chain aliphatic radicals having from 1 to about 15 carbon atoms, cycloaliphatic radicals having from 3 to about 20 carbon atoms, and aryl radicals having from 6 to about 42 carbon atoms;

b. withdrawing a purified product gas from said contacting zone;

c. passing said solvent from said contacting zone to a stripping zone;

d. stripping absorbed gases from said solvent in said stripping zone;

e. mixing said stripped solvent with an alkaline wash solution and passing the mixture to a separation zone;

f. separating spent alkaline wash solution from said stripped solvent in said separation zone;

g. passing said spent alkaline solution from said separation zone to a regeneration zone;

h. contacting said spent alkaline solution with an oxidizing agent in said regeneration zone; and i. recovering reconstituted organic disulfides from said regeneration zone.

* * * * *